United States Patent [19]

Greenman et al.

[11] 4,423,109

[45] Dec. 27, 1983

[54] FIBER REINFORCED RUBBER GASKET MATERIAL

[75] Inventors: Norman L. Greenman, Woodstock; Richard C. Berry, Danielson; Douglas H. Tracy, Putnam; Bruce M. Arnio, Danielson; Michael S. Lunt, Abington; Jeffrey B. Otto, Brooklyn, all of Conn.

[73] Assignee: Rogers Corporation, Rogers, Conn.

[21] Appl. No.: 307,653

[22] Filed: Oct. 2, 1981

[51] Int. Cl.$^3$ .............................................. D04H 1/58
[52] U.S. Cl. .................................. 428/288; 428/290; 428/291
[58] Field of Search ....................... 428/288, 290, 291

[56] References Cited

U.S. PATENT DOCUMENTS 4,234,636 11/1980 Thorsrud et al. .................. 428/290

*Primary Examiner*—Marion McCamish
*Attorney, Agent, or Firm*—David S. Fishman

[57] ABSTRACT

An improved fiber reinforced material for use in the manufacture of gaskets is produced by impregnating a nonwoven fabric with an aqueous dispersion of a rubber and filler. The water is then evaporated out of the impregnated fabric. The final product is formed by curing the rubber under heat and pressure.

18 Claims, No Drawings

FIBER REINFORCED RUBBER GASKET MATERIAL

BACKGROUND OF THE INVENTION (1) Field of the Invention

The present invention relates to the manufacture of a fiber reinforced compressible material and particularly to a material useful in the manufacture of gaskets. The present invention is also directed to a gasket material comprising fibers and a rubber. Accordingly, the general objects of the present invention are to provide an improved material and method of manufacture thereof.

(2) Description of the Prior Art

In order to meet government regulations regarding the emissions of certain gases, such as hydrocarbons and halogens, gaskets in mechanically jointed flanges must be able to maintain their seal and prevent leakage of fluids and gases even when subjected to an extremely severe operating environment and undesirable mechanical conditions. Thus, these gaskets must be able to function even though the flanges are either poorly designed or poorly machined and must maintain the ability to seal the flange and prevent leakages even under high operating temperatures and high internal pressures. Gaskets produced from many prior art materials either leak or blow out when exposed to the aforementioned conditions and environments.

Accordingly, it is one of the many objects of the present invention to produce a gasket material which exhibits desirable sealability, creep resistance and blow out resistance characteristics.

SUMMARY OF THE INVENTION

The present invention overcomes the above-discussed disadvantages and other deficiencies of the prior art and provides a novel and improved fiber reinforced rubber material for use in the manufacture of gaskets.

The improved fiber reinforced rubber material in accordance with the present invention is produced by impregnating a nonwoven fabric with an aqueous dispersion of rubber and filler until saturated. The aqueous dispersion may further contain varying amounts of inorganic particulate fillers, compounding agents or other materials necessary to impart the desired characteristics to the final product. The impregnated fabric is heated, to evaporate out the water, and is then pressed at a temperature which is sufficiently high to cure the rubber. The final product may be used to form gaskets.

DESCRIPTION OF THE PREFERRED EMBODIMENT

The improved fiber reinforced rubber material of the present invention is formed by first impregnating a nonwoven fabric comprised of natural or synthetic fibers with an aqueous dispersion of either a natural or synthetic rubber until saturated. The aqueous dispersion also contains varying amounts of inorganic particulate fillers, such as mica, silica, calcium carbonate, carbon black or clay, and will typically also include compounding agents such as accelerators, curatives, and antioxidants, in order to achieve the desired saturate rheology and final product characteristics. This saturation is accomplished by dip coating, knife coating, roll coating or other coating techniques well known to those skilled in the art. The saturation of the nonwoven fabric should be sufficient enough to achieve the desired rubber content in the final product.

The next step involves heating or drying the now saturated nonwoven fabric to evaporate out all the water. The temperature should range from the lowest temperature required to evaporate out the water, depending upon the dispersion content and the thickness of the nonwoven fabric, to below the melting or degrading temperature of the fibers used, preferably between 150° F. to 450° F.

Forming the final product requires a curing of the rubber by subjecting the fabric to a pressure between 50 and 3000 pounds per square inch and a temperature between 250° F. and 450° F. Preferably, this curing step utilizes hot platens to press the fabric.

Table 1 illustrates the acceptable and preferred ranges of the quantities of the ingredients in an aqueous dispersion useful in the practice of the present invention expressed in percentages by dry weight in the final product.

TABLE I

| Ingredients | Acceptable Ranges | Preferred Ranges |
|---|---|---|
| Elastomeric Binder | 10–80 | 25–50 |
| Inorganic Filler | 10–80 | 40–70 |
| Compounding Agents | 2–10 | 3–7 |

The present invention may also include extenders, plasticizers, pigments antioxidants, curatives, release agents and other processing aids as necessary.

The nonwoven fabric may be comprised of natural or synthetic fibers with cellulose, fiberglass, polyolefin, polyamide, polyester, polyimide and polyacrylic fibers being representative examples of such fibers. Elastomeric binders useful in the practice of the present invention may include natural or synthetic rubber, such as chloroprene, nitrile, isoprene, acrylic or styrene-butadiene rubber or blends of these types of rubbers.

The nonwoven fabric should be saturated with an aqueous dispersion of between 30% to 60% solids, these solids being the elastomeric beinder, inorganic filler and compounding agents, so that between 70–90% by weight of the final product will be made up of the solids and 10–30% by weight will be made up of the fibers comprising the nonwoven fabric. If the aqueous dispersion comprises less than 30% solids then it would be difficult to obtain a final product having at least 70% by weight of the solids and if the dispersion comprises more than 60% solids there will be flow problems.

An example of the present invention was prepared by impregnating a nonwoven fabric, of three denier polyester fiber, which had an approximate weight of 4.65 ounces per square yard, with an aqueous dispersion of chloroprene rubber latex and a filler until saturated, as established when 34% rubber content or an 85% weight increase was obtained. The aqueous dispersion contained the following solids: Chloroprene rubber, 50 grams; C3000 mica, 50 grams; zinc oxide, 7.5 grams; sulphur, 2 grams; nickel butyl carbonate, 5 grams; antioxident, 2 grams; and phenolic resin, 10 grams.

The saturated fabric was dried in a circulating oven at 230° F. and the rubber was then cured by pressing the fabric between hot platens, at 2000 pounds per square inch and at 320° F., for two minutes.

The final product demonstrated the following qualities:

| Parameter | Results |
| --- | --- |
| Thickness, in. | .022 |
| Density, g/cc | 1.55 |
| C D Tensile, psi; per ASTM F 152 | 4,100 |
| Sealability, ml/hr; per ASTM F37, Fuel A 250 psi, 30 "Hg | .96 |
| A Creep, %; per ASTM F38B, 22 hrs, 105° C., 3000 psi | 15.7 |
| B Creep, %; per ASTM F38B, 20 hrs, 150° C., 2500 psi | 22.4 |
| Compressibility @ 5000 psi, %; per ASTM F36, Type 1 material | 8.7 |
| Recovery, %; per ASTM F36, Type 1 material | 62.7 |
| Elmendorf tear, gms; per ASTM D689 | 721 |

Two other examples, and the demonstrated qualities, are as follows.

EXAMPLE II

| Ingredient | % Total of Saturant |
| --- | --- |
| Nitrile LCG61C Latex | 12.7 |
| Neoprene 735 Latex | 12.7 |
| ABS DSC-44B Latex | 12.7 |
| Calcium Carbonate | 57.1 |
| Zinc Oxide | 3.1 |
| Sulfur | 1.1 |
| Antioxident | .6 |

A nonwoven fabric, of three and six denier one & one-half inch polyester fibers, having a 3.2 ounce per square yard web weight, was impregnated with the above saturant until saturated. The now saturated web was dried at a temperature of 250° C. for 20 minutes and the rubber cured, by pressing the fabric between hot platens, which were compressed at 2000 psi and at a temperature of 300° F. for 5 minutes.

The finished product demonstrated the following qualities:

| Parameter | Results |
| --- | --- |
| Thickness, in. | .031 |
| Density, g/cc | 1.85 |
| Tensile, psi; per ASTM F 152 | 2500 |
| Sealability, ml/hr; per ASTM F37, Fuel A 250 psi, 30 "Hg | .1 |
| A Creep, %; per ASTM F38B, 22 hrs, 105° C., 3000 psi | 29. |
| Compressibility @ 5000 psi, %; per ASTM F36, Type 1 material | 20.0 |
| Recovery, %; per ASTM F36, Type 1 material | 70.0 |
| Elmendorf tear, gms; per ASTM D689 | 560 |

EXAMPLE III

| Ingredient | % of Saturant |
| --- | --- |
| Nitrile LCG61C Latex | 18.5 |
| Neoprene 736 Latex | 18.5 |
| Calcium Carbonate | 55.6 |
| Zinc Oxide | 1.9 |
| Sulfur | .7 |
| Antioxident | 1.1 |
| Stabilizer | 3.7 |

A nonwoven fabric, of 3 and 6 denier one and one-half inch polyester fibers, having a 3.2 ounce per square yard web weight, was impregnated with the above saturants until saturated. The now saturated web was dried at a temperature of 255° F. for 30 minutes and the rubber cured by pressing the fabric between hot platens, which were compressed at 1750 psi and at a temperature of 300° F. for 3 minutes.

The finished product demonstrated the following qualities:

| Parameter | Results |
| --- | --- |
| Thickness, in. | .040 |
| Density, g/cc | 1.75 |
| Tensile, psi; per ASTM F 152 | 1750 |
| Sealability, ml/hr; per ASTM F37, Fuel A 250 psi, 30 "Hg | 5 |
| A Creep, %; per ASTM F38B, 22 hrs, 105° C., 3000 psi | 29.3 |
| Compressibility @ 5000 psi, %; per ASTM F36, Type 1 material | 25.0 |
| Recovery, %; per ASTM F36, Type 1 material | 60.0 |
| Elmendorf tear, gms; per ASTM D689 | 818 |

While preferred embodiments have been shown and described, various modifications and substitutions may be made thereto without departing from the spirit and scope of the invention. Accordingly, it must be understood that the present invention has been described by way of illustration and not limitation.

What is claimed is:

1. A fiber reinforced gasket material comprising:
   70% to 90% by weight of a composition comprising:
   10% to 80% elastomeric binder;
   10% to 80% inorganic particulate filler;
   2% to 20% compounding agents; and
   10% to 30% by weight of a nonwoven fabric of organic fibers selected from the group consisting of cellulose, polyolefin, polyamide, polyimide, polyester and polyacrylic fibers;
   said fabric being impregnated with said composition to constitute a fiber reinforced gasket material.

2. The gasket material of claim 1 wherein said elastomeric binder is selected from the group consisting of: natural and synthetic rubbers.

3. The gasket material of claim 1 wherein said elastomeric binder is selected from the group consisting of: chloroprene, nitrile, isoprene, and styrene-butadiene binders.

4. The gasket material of claim 1 wherein said inorganic particulate fillers are selected from the group consisting of: mica, silica, calcium carbonate, carbon black and clay.

5. A fiber reinforced gasket material comprising:
   70% to 90% by weight of a composition comprising:
   10% to 80% elastomeric binder;
   10% to 80% inorganic particulate filler;
   2% to 20% compounding agents; and
   10% to 30% by weight of a nonwoven fabric of fiberglass fibers;
   said fabric being impregnated with said composition to constitute a fiber reinforced gasket material.

6. The gasket material of claim 5 wherein said elastomeric binder is selected from the group consisting of: natural and synthetic rubbers.

7. The gasket material of claim 5 wherein said elastomeric binder is selected from the group consisting of: chloroprene, nitrile, isoprene, and styrene-butadiene binders.

8. The gasket material of claim 5 wherein said inorganic particulate fillers are selected from the group consisting of:
mica, silica, calcium carbonate, carbon black and clay.

9. A method of manufacturing a fiber reinforced gasket material comprising the steps of:
saturating a nonwoven fabric formed from organic fibers with an aqueous dispersion of between 30% to 60% solids, said solids comprising:
10% to 80% elastomer binder;
10% to 80% inorganic particulate filler; and
2% to 20% compounding agents;
removing said water from said saturated fabric by subjecting said saturated fabric to a sufficient amount of heat to remove said water but not degrade said solids; and
applying heat and pressure to said saturated fabric.

10. The method of claim 9 wherein:
said fabric is a nonwoven fabric formed of fibers selected from the group consisting of:
cellulose, polyolefin, polyamide, polyimide, polyester and polyacrylic fibers.

11. The method of claim 10 wherein:
said elastomeric binder is selected from the group consisting of natural and synthetic rubbers.

12. The method of claim 10 wherein:
said elastomeric binder is selected from the group consisting of:
chloroprene, nitrile, isoprene, and styrene-butadiene binders.

13. The method of claim 10 wherein:
said inorganic fillers are selected from the group consisting of:
mica, silica, calcium carbonate, carbon black and clay.

14. A method of manufacturing a fiber reinforced gasket material comprising the following steps:
saturating a nonwoven fabric formed from inorganic fibers with an aqueous dispersion of between 30% to 60% solids, said solids comprising:
10% to 80% elastomer binder;
10% to 80% inorganic particulate filler; and
2% to 20% compounding agents;
removing said water from said saturated fabric by subjecting said saturated fabric to a sufficient amount of heat to remove said water but not degrade said solids; and
applying heat and pressure to said saturated fabric.

15. The method of claim 14 wherein:
said fabric is a nonwoven fabric of fiberglass.

16. The method of claim 15 wherein:
said elastomeric binder is selected from the group consisting of natural and synthetic rubbers.

17. The method of claim 15 wherein:
said elastomeric binder is selected from the group consisting of:
chloroprene, nitrile, isoprene, and styrene-butadiene binders.

18. The method of claim 15 wherein:
said inorganic fillers are selected from the group consisting of:
mica, silica, calcium carbonate, carbon black and clay.

* * * * *